(12) United States Patent
Bakken et al.

(10) Patent No.: US 7,847,707 B2
(45) Date of Patent: Dec. 7, 2010

(54) METHOD AND SYSTEM FOR COLLECTING METER READINGS IN WIRELESS TRANSMISSIONS FROM UNLISTED CUSTOMERS

(75) Inventors: Bruce M. Bakken, Greenfield, WI (US); David J. Lowe, Grafton, WI (US); Mark Lazar, New Berlin, WI (US); Michele R. B. Malinowski, Hartford, WI (US)

(73) Assignee: Badger Meter, Inc., Milwaukee, WI (US)

( * ) Notice: Subject to any disclaimer, the term of this patent is extended or adjusted under 35 U.S.C. 154(b) by 940 days.

(21) Appl. No.: 11/714,962

(22) Filed: Mar. 7, 2007

(65) Prior Publication Data
US 2008/0218378 A1 Sep. 11, 2008

(51) Int. Cl.
*G08C 15/06* (2006.01)
(52) U.S. Cl. .............. 340/870.02; 235/375; 340/825.49
(58) Field of Classification Search ........................ None
See application file for complete search history.

(56) References Cited

U.S. PATENT DOCUMENTS

| 5,719,564 | A | * | 2/1998 | Sears | ..................... 340/870.02 |
| 7,109,882 | B2 | | 9/2006 | Angelis et al. | |
| 2005/0210131 | A1 | | 9/2005 | Motoyama et al. | |
| 2006/0022841 | A1 | | 2/2006 | Hoiness et al. | |
| 2006/0074601 | A1 | | 4/2006 | Hoiness et al. | |
| 2007/0236362 | A1 | * | 10/2007 | Brian et al. | ............ 340/870.02 |

OTHER PUBLICATIONS

Badger Meter, Inc. Technical Brief re: Orion Reading Software Premium ORS Kit, dated Oct. 2005.

* cited by examiner

*Primary Examiner*—Timothy Edwards, Jr.
(74) *Attorney, Agent, or Firm*—Boyle Fredrickson, S.C.

(57) ABSTRACT

An out-of-route collection capability is provided for an AMR data collection system of a type that collect readings within a geographic area using a radio. If a transmission is received from an out-of-route transmitter, its location is based on a geographic location of the data collector as the data collector receives data from the out-of-route transmitter. The location can further be determined by evaluating a received signal strength indicator (RSSI) for the transmission. The out-of-route transmitter is identified by association with a transmitter identification number. The out-of-route transmitters can be added to the route through operations at the central office.

15 Claims, 4 Drawing Sheets

METHOD AND SYSTEM FOR COLLECTING METER READINGS IN WIRELESS TRANSMISSIONS FROM UNLISTED CUSTOMERS

TECHNICAL FIELD

This invention relates to automatic meter reading (AMR) systems, and in particular to utility meters using a radio transmitter for transmitting metering data signals to a radio receiver in a network for collecting utility metering data.

DESCRIPTION OF THE BACKGROUND ART

Cerny et al., U.S. Pat. No. 5,298,894, discloses a mobile automatic meter reading (AMR) system. In such a system, a utility meter transmitter receives signals from a signal transducer installed on a utility meter. The transmitter then transmits radio frequency (RF) meter data signals to an RF collection unit in a drive-by vehicle. In these mobile AMR systems, either a vehicle or a person on foot with an RF collection unit (a walk-by collection system) can move through a neighborhood and collect a large number of readings per hour without entering any of the property of the customers.

In systems providing GPS/GIS information, it has been the practice to determine the GPS/GIS location of each transmitter. In some cases, it has been necessary to stop at each transmitter to collect such information.

Hoiness, U.S. Pat. Pub. No. US 2006/0022841, discloses a computer system for directing a vehicle along a predetermined route. The computer system reads GPS/GIS data and also displays a current, predetermined route, with location information being collected for endpoints not included in the predetermined route. When a data file, called an endpoint file, is uploaded to a server, the server that will calculate an optimized route for future collections and compare it to the current route and provide displayable data for making a comparison. Hoiness, U.S. Pat. Pub. No. 2006/0074601 and Angelis, U.S. Pat. No. 7,109,882, describe further details of this system. This system is fairly sophisticated in utilizing both software and servers in carrying out its operations. There remains a need to provide an easy-to-use, smaller and less costly system for accomplishing the goals of collecting readings from customers not on a route listing.

SUMMARY OF THE INVENTION

The invention provides a method and a data collector for collection of meter reading data from transmitters within a geographical area that are identified on a route list or route map, as well as from transmitters not on the route list or route map, which are defined as "out-of-route."

In the present invention, radio signals are received from transmitters within range of the receiver as the receiver travels through the geographical area. A GPS/GIS unit is used to obtain geographical information, particularly of the vehicle in relation to each transmitter. When an out-of-route or unlisted transmitter transmits data to a receiver, the system notes the geographic location of the vehicle and also associates the data with the transmitter identification number.

The out-of-route readings can then be displayed or communicated in a file with transmitter identification numbers.

In a further aspect of the invention, the out-of-route meter readings can be associated and displayed with transmitter identification numbers for a nearest transmitter that is included in the route list or route map.

In a further aspect of the invention, the geographical information is recorded at the location where the RSSI (received signal strength indicator) signal is the strongest from the unlisted transmitter. The receiver can receive signals at several different locations as it moves along a street, so by measuring the RSSI signal, a location of greatest signal strength is identified and a geographical location is stored in memory for that location of greatest signal strength.

The data collector can be carried in a vehicle or can be a handheld data collector carried by a person.

Other objects and advantages of the invention, besides those discussed above, will be apparent to those of ordinary skill in the art from the description of the preferred embodiments which follows. In the description, reference is made to the accompanying drawings, which form a part hereof, and which illustrate examples of the invention.

BRIEF DESCRIPTION OF THE DRAWINGS

FIG. 3 is a screen display of a record for a transmitter in the route list; and

FIG. 4 is a screen display of out-of-route readings of utility usage data; and

DETAILED DESCRIPTION OF THE PREFERRED EMBODIMENTS

Figure 1:
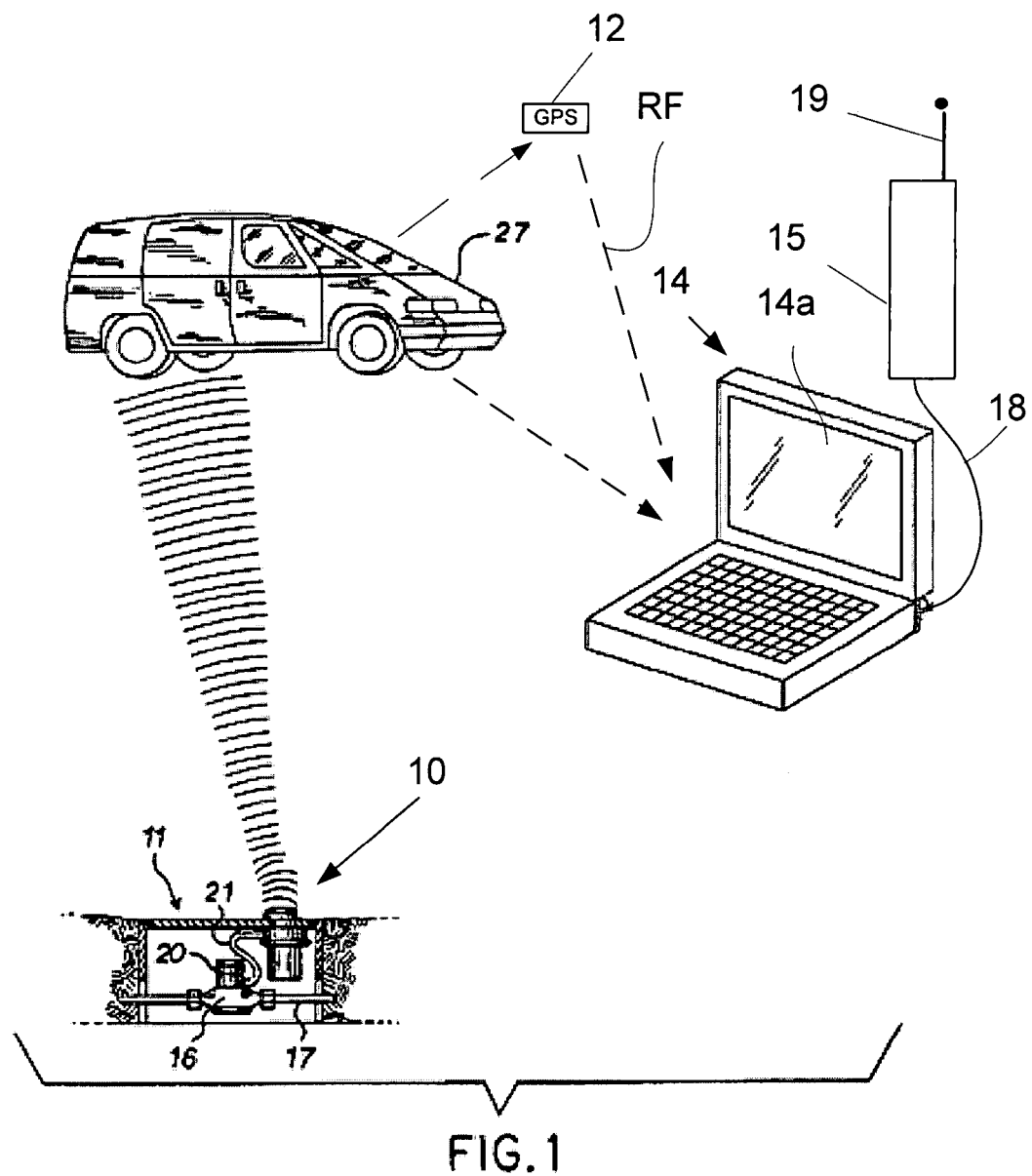
FIG. 1 is a perspective view of an AMR system with a drive-by mobile data collector system for receiving transmissions from a transmitter associated with a utility meter.

Referring to FIG. 1, a transmitter unit 10 is located in a subsurface pit enclosure 11. The pit enclosure 11 is typically made of metal and includes sidewalls and a lid which is removable to open the enclosure for access. The pit enclosure 11 is located along the route of water supply pipe 17. The transmitter unit 10 is housed in a housing which has features known in the art to protect the electronic portions from moisture in the pit enclosure 11.

A water meter element (not shown) is provided inside of a water meter housing 16. A meter register 20 is mounted on top of the water meter housing 16 and it responds to movements of the water meter element in a manner known in the art to accumulate a total number of units of consumption of water. The meter register 20 is preferably one including a signal transducer for signaling incrementally encoded signals, such as the High Resolution Transmitter offered by Badger Meter, Inc., the assignee of the present invention. This transducer is described in Strobel et al., U.S. Pat. No. 4,868,566, entitled "Flexible Piezoelectric Switch Activated Metering Pulse Generators."

In an alternative, the register 20 may incorporate a digital absolute position encoder, offered under the trade designation ADE. This register utilizes non-contact Light Emitting Diodes (LEDs) (not shown) to provide a six-digit reading.

The meter register 20 may also include a dial face and an odometer to enable a technician or utility customer to read an accumulated value for consumption of water. Although the description herein applies to a water meter, it would also be possible to apply the invention to other utility meters such as gas meters or electric meters.

The meter register 20 connects via a cable 21 to the transmitter unit 10, which in this embodiment is attached to, and hangs down from the pit lid. An antenna is positioned within a top portion of the unit 10.

As seen in FIG. 1, the transmitter unit 10 communicates via radio waves with a collection system 12, 14, 15 while it is being carried in a vehicle 27. This system is also referred to herein as a "data collector." The transmitter unit 10 is normally in a dormant or low power state. Periodically, it wakes up and transmits a message which includes a transmitter identification number, meter reading data, and an error code for checking the data at the receiving end.

The data collector 12, 14, 15 includes an Orion® receiver 15, a Panasonic TOUGHBOOOK laptop computer 14 and a serial cable 18. The Orion® receiver 15 has an antenna 19 and an external antenna (not shown) for mounting on a roof of the vehicle 27 can also be used to improve reception. The data collector also includes a small GPS receiver 12 that is placed on the vehicle dashboard and signals the GPS location of the vehicle to the Orion® receiver 15 through Bluetooth or another short range wireless network.

Although, the preferred embodiment utilizes a "receive-only" receiver 15, it should be understood that unless specified as "receive-only," that the term "receiver" includes transceivers for two-way radio communication. In other embodiments, it is possible to transmit one or more signals before receiving a meter reading from the transmitter. Also, whereas the preferred embodiment utilizes one-way, transmit-only transmitters near the meters, that unless specified as "one-way" or "transmit-only," that the term "transmitter" should be understood to include two-way transceivers including both a transmitter and a receiver located near the meter for transmitting meter reading data.

Figures 3, 4:
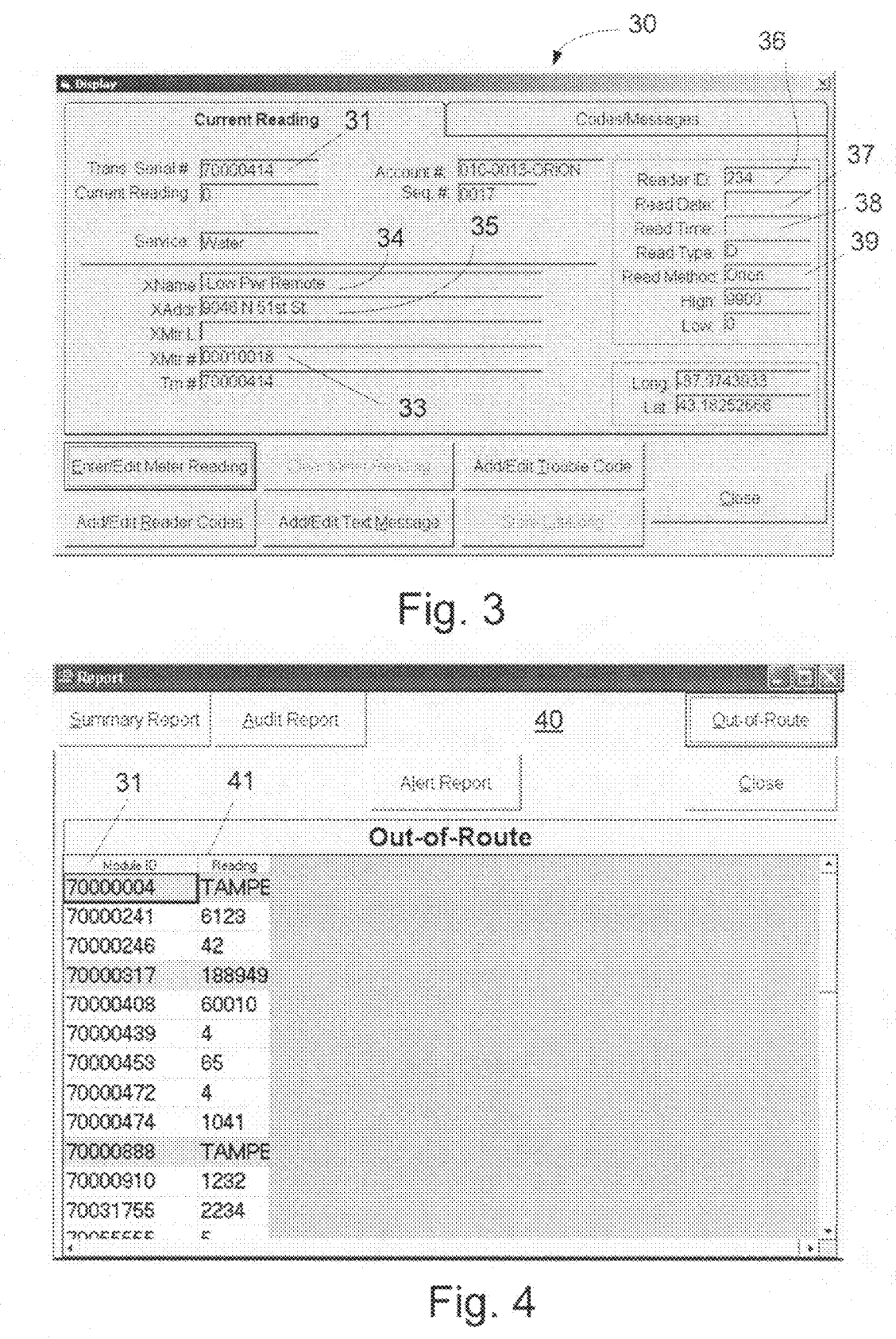

The computer 14 is loaded with a route list of meter/transmitter locations to be read. This list can be displayed in a list mode or in a map mode. FIG. 3 shows a "current reading" record 30 in the computer 14 for a typical meter/transmitter location on the route. A transmitter identification (serial) number 31 is used as an identification number for the transmitter associated with a utility meter. An account number 32, a meter number 33 and a customer name 34 and a street address 35 are also included in the record 30. The customer address 35 has been associated with the transmitter in the central office computer and downloaded into the data collection computer 14. Also seen in the collection record 30 is an identification number 36 for the data collector, a read date 37 and a read time 38 and a method of collection status data 39.

The driver of the vehicle 27 has discretion as to the route that is actually driven to collect meter data from meter/transmitter units on the route list or route map. The route list or route map in this example does not specify an actual route that is driven. After the computer 14 has received all of the readings along the route actually driven, these readings will be transferred to a computer at an office running a CONNECT® application program. This program provides an interface between the utility's billing and accounting system and the collection system 14, 15. This program downloads a route list to the data collection computer 14 and uploads collected meter data from the data collection computer 14.

There are times when the data collector 12, 14, 15 may detect transmissions from transmitters along its way of travel that are not on the route list or not marked on the map as being on the route for various reasons. It is an object of the present invention to allow the data collector 12, 14, 15 and more particularly the data collection computer 14 to collect these readings for uploading to the computer at the office that runs the CONNECT® application program.

Figure 5:
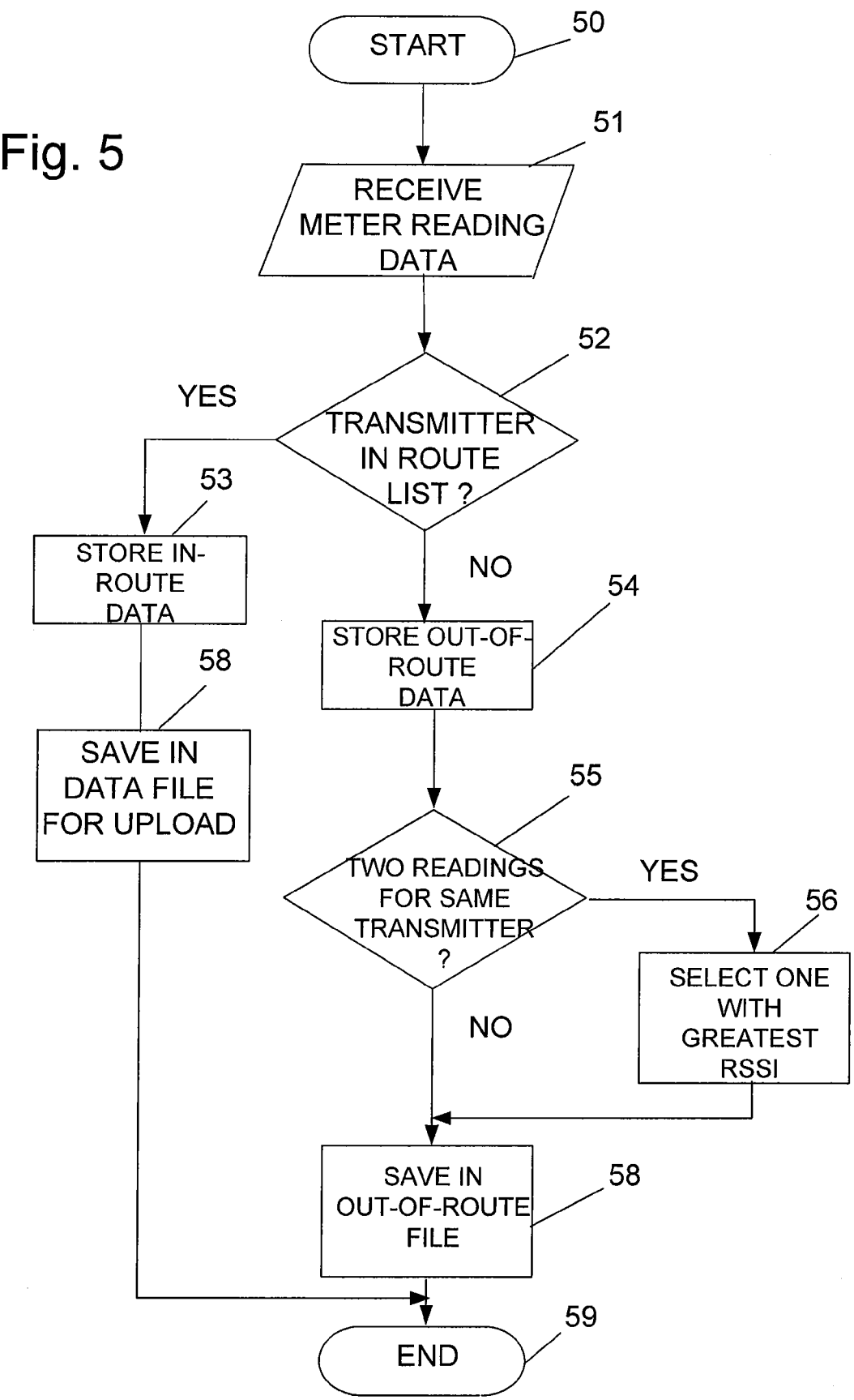
FIG. 5 is a flow chart of an out-of-route program module of program instructions.

An out-of-route program module of program instructions is added to the program stored in memory in the data collection computer 14 to perform the following functions. The operation of this module is illustrated in FIG. 5, where the blocks represent execution of one or more program instructions beginning with start block 50. When an item of meter reading data is received, the basic program in the data collection computer 14 stores the reading and marks the meter having that transmitter ID number as having been read, as represented by I/O block 51 and process block 53. If the message does not include a transmitter ID of a transmitter/meter location in the current route list, as represented by the "No" result, from decision block 52, the out-of-route program instructions cause the meter data to be stored in a table of out-of-route transmitter/meter readings, as represented by process block 54. An example of such a table is shown in FIG. 4. As used herein, the terms "meter reading" and "item of meter reading data" are synonymous.

Figure 2:
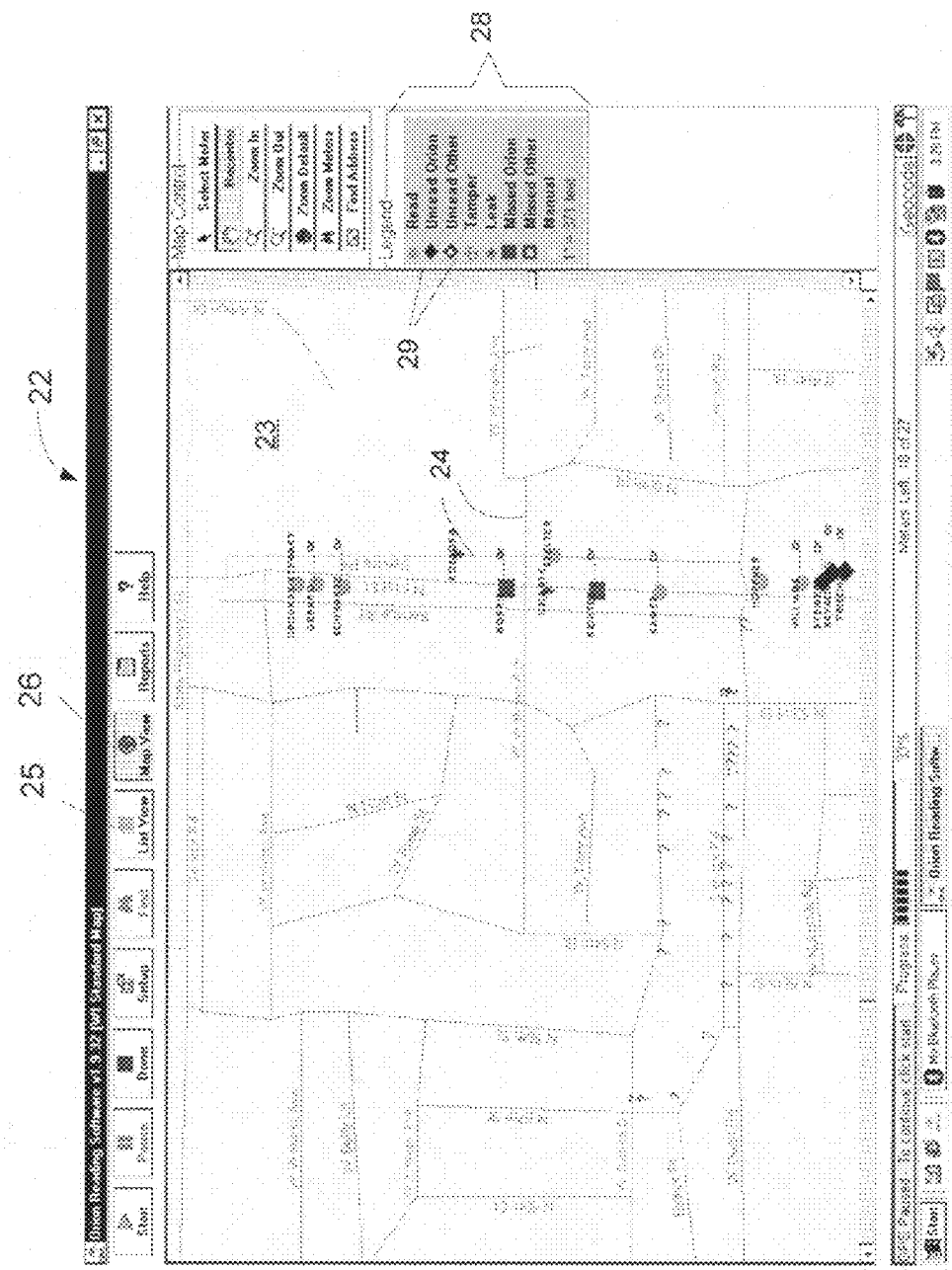
FIG. 2 is a screen display of a route map displayed by the data collector system during collection of meter readings.

FIG. 2 shows a screen display as a window 22 that would appear on a display device portion 14a of the data collection computer 14 in a "map" mode of operation. This window frames a map 23 of a geographic area comprising a plurality of intersecting streets 24 or other types of publicly identified roadways. The locations to be read can be shown in a map view or a list view by operation of buttons 25, 26. The display device portion 14a in this instance is also a touch screen for receiving touch inputs from a user. The window 24 provides a legend 28 that shows symbols 29 for a "read" meter of any type (●) on the route list, an unread meter on the route list of type A (◆), an unread meter on the route list of type B (◇), a missed meter on the route list of type A (■) and a missed meter of type B on the route list (□). The locations of sources for out-of-route readings is shown in FIG. 2 by question marks, "?".

In addition to the "map" mode of operation, the locations on the route list can also be displayed in a "list" mode of operation. To display out-of-route readings a report mode of operation is selected.

As seen in FIG. 4, in a report screen display 40 each out-of-route end location and reading 41 is associated with the transmitter identification number 31, which is received in a data message with an item of meter reading data. In a further aspect of the invention, data for an out-of-route meter/transmitter can be associated with the nearest transmitter unit included in the route list. It is to be noted that besides consumption numbers, the reading 42 may indicate status/condition data for tampering or leakage, as is known in the art.

In addition to identifying the out-of-route transmitter by association of collected data with a transmitter identification number for a nearest transmitter that is identified on the route list, the out-of-route program module, as illustrated in FIG. 5, determines a location of the out-of-route transmitter based on a geographic location of the data collection computer 14 as the data collection computer 14 receives data from the out-of-route transmitter located by a "?" as seen in FIG. 2. This geographic location is the latitude and longitude of the vehicle 27 or the data collector 12, 14, 15 as determined from the signals from the GPS receiver module 12. The data collection computer 14 may receive a plurality of data messages from an out-of-route transmitter as the vehicle 27 is driven along a street, and this is represented by the "Yes" result from executing decision block 55 in FIG. 5. To determine a more exact geographical location, the data collection computer 14 examines a received strength signal indicator (RSSI) detected by the receiver 15 when the data is received. In executing the program instructions of the present invention, the data collection computer 14 detects a highest value of a received strength indicator signal that is associated with data from an out-of-route transmitter and a geographic location by latitude and longitude received from the GPS receiver module in the vehicle as represented by process block 56. This can be accomplished by comparing a received signal strength indicator (RSSI) for at least two items of meter reading data received at two respective geographic locations and selecting one of the two respective geographic locations according to where a higher received signal strength indicator (RSSI) signal is detected for one of the two items of meter reading data. The meter reading data for the out-of-route transmitters is saved in a table for processing back at a central office, as represented by process block 57. The in-route readings would be stored in a separate file as represented by process block 58. The routine then ends as represented by the end block 59.

The term "geographic location" should be understood to include geographic locations determined by either GPS or GIS systems. It does not include a street address because it is the lack of a customer street address and the presence of a transmitter identification number that means that the source of the meter data signals is not on the route list.

The table of out-of-route readings is processed back at the central office and may result in transmitters being added to the route that is downloaded to the data collector for the next collection cycle.

This has been a description of the preferred embodiments, but it will be apparent to those of ordinary skill in the art that variations may be made in the details of these specific embodiments without departing from the scope and spirit of the present invention, and that such variations are intended to be encompassed by the following claims.

We claim:

1. A data collector for use in collection of items of meter reading data from respective transmitters in a geographic area that are identified on a route list or route map and meter reading data from at least one out-of-route transmitter that is not included in the route list or route map, the data collector comprising:
   a radio portion for receiving signals representing meter reading data from transmitters within range of the data collector as the data collector travels through the geographic area;
   a geographic portion for determining a location of the out-of-route transmitter based on a geographic location of the data collector as the data collector receives an item of meter reading data from the out-of-route transmitter; and
   the geographic portion determines a geographic location of the data collector from a plurality of items of meter reading data received from the out-of-route transmitter by detecting a highest value of a received strength signal indicator that is associated with one of the plurality of items of meter reading data
   an identification portion for identifying the out-of-route transmitter by association of each item of meter reading data with a respective transmitter identification number.

2. The data collector of claim 1, wherein the transmitter identification number associated with the out-of-route transmitter is a transmitter identification number for a nearest in-route transmitter that is included in the route list or route map.

3. The data collector of claim 1, wherein the data collector is carried by a vehicle.

4. The data collector of claim 1, further comprising an output device for displaying a listing of out-of-route readings identified by respective transmitter identification numbers.

5. The data collector of claim 4, wherein the transmitter identification number associated with the out-of-route transmitter is a transmitter identification number for a nearest in-route transmitter that is included in the route list or route map.

6. The data collector of claim 1, wherein the data collector includes a computer, a radio portion and a GPS receiver.

7. The data collector of claim 6, wherein the geographic portion includes the GPS receiver and a portion of the computer.

8. The data collector of claim 6, wherein the radio portion includes the radio receiver.

9. A method for collection of meter reading data from transmitters in a geographic area which are identified on a route list or route map and from transmitters not on the route which are defined as "out-of-route," the method comprising:
   receiving a plurality of radio frequency signals representing meter reading data from transmitters within range of a receiver as the receiver travels through the geographic area;
   determining a location of an out-of-route transmitter based on a geographic location of a location of the receiver as the receiver receives data from the out-of-route transmitter; and
   determining the location of an out-of-route transmitter further includes comparing a received signal strength indicator (RSSI) for at least two items of meter reading data received at two respective geographic locations and selecting one of the two respective geographic location according to where a higher receive signal strength indicator (RSSI) signal is detected for one of the two items of meter reading data;
   identifying the out-of-route transmitter by association of each item of meter reading data with a transmitter identification number.

10. The method of claim 9, wherein the transmitter identification number associated with the out-of-route transmitter is a transmitter identification number for a nearest transmitter that is included in the route list or route map.

11. The method of claim 9, wherein the meter reading data are collected using a data collector that is carried by a vehicle.

12. The method of claim 10, further comprising providing a listing of out-of-route readings identified by respective transmitter identification numbers.

13. The method of claim 12, wherein the transmitter identification number for each reading is for a nearest transmitter that is included in the route list or route map.

14. A data collector for use in collection of items of meter reading data from respective transmitters in a geographic area that are identified on a route list or route map and meter reading data from at least one out-of-route transmitter that is not included in the route list or route map, the data collector comprising:
   a radio portion for receiving signals representing meter reading data from transmitters within range of the data collector as the data collector travels through the geographic area;
   a geographic portion for determining a location of the out-of-route transmitter based on a geographic location of the data collector as the data collector receives an item of meter reading data from the out-of-route transmitter; and
   an identification portion for identifying the out-of-route transmitter by association of each item of meter reading data with a respective transmitter identification number;
   wherein the transmitter identification number associated with the out-of-route transmitter is a transmitter identification number for a nearest in-route transmitter that is included in the route list or route map; and wherein the geographic portion determines a geographic location of the data collector from a plurality of items of meter reading data received from the out-of-route transmitter by detecting a highest value of a received strength signal indicator that is associated with one of a plurality of items of meter reading data.

15. A method for collection of meter reading data from transmitters in a geographic area which are identified on a route list or route map and from transmitters not on the route which are defined as "out-of-route," the method comprising:
  receiving a plurality of radio frequency signals representing meter reading data from transmitters within range of a receiver as the receiver travels through the geographic area;
  determining a location of an out-of-route transmitter based on a geographic location of a location of the receiver as the receiver receives data from the out-of-route transmitter;
  identifying the out-of-route transmitter by association of each item of meter reading data with a transmitter identification number;
  wherein the transmitter identification number associated with the out-of-route transmitter is a transmitter identification number for a nearest transmitter that is included in the route list or route map; and
  wherein determining the location of an out-of-route transmitter further includes determining a geographic location of the receiver from a plurality of items of meter reading data received from the out-of-route transmitter by detecting a highest value of a received strength signal indicator that is associated with one of the plurality of items of meter reading data.

* * * * *